(12) United States Patent
Rudd et al.

(10) Patent No.: US 6,359,977 B1
(45) Date of Patent: Mar. 19, 2002

(54) TELEPHONE PORT WITH AUTOMATIC DETECTION AND SECURE

(75) Inventors: Clarence C. Rudd, Noblesville; Linmei Shu, Carmel, both of IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/306,012

(22) Filed: May 6, 1999

(51) Int. Cl.$^7$ .............................................. H04M 13/00

(52) U.S. Cl. .............................. 379/184; 379/7; 379/35; 379/168

(58) Field of Search .................... 379/156, 159–160, 379/161, 164, 165, 177, 179, 182–184, 187, 7, 35, 167.01, 167.11, 168, 171

(56) References Cited

U.S. PATENT DOCUMENTS 5,392,332 A * 2/1995 Core et al. ..................... 379/67
6,167,262 A * 12/2000 Tanigawa ..................... 455/426

FOREIGN PATENT DOCUMENTS

JP          362090098          *  4/1987

* cited by examiner

Primary Examiner—Duc Nguyen
(74) Attorney, Agent, or Firm—Joseph S. Tripoli; Frank Y. Liao

(57) ABSTRACT

A method and system for automatically detecting that a telephone port is being used and securing the telephone line associating with the telephone port, is presented. In one embodiment, a method and system is described for automatically securing a telephone line in a telephone system having more than one telephone lines. Usage of a device connected to the telephone line is first detected. Telephones in the system are notified via a data packet to secure the telephone line. In response to the data packet, the telephones prevent a user from accessing the telephone line.

12 Claims, 14 Drawing Sheets

| CHANNEL TYPE | | FREQUENCY | MAX. POWER (135 ohms) | RESIDUAL FM | DISTORTION | SPURIOUS | MAX. DEVIATION |
|---|---|---|---|---|---|---|---|
| AUDIO (PAGE) | TRANSMIT | 390 KHz | -10 dBm | <200Hz | 3% AT 1KHz | -50 dB | +/-5 Khz |
| AUDIO (INTERCOM) | ORIGINATE | 420 KHz | -10 dBm | <200Hz | 3% AT 1KHz | -50 dB | +/-5 Khz |
| AUDIO (INTERCOM) | ANSWER | 360 KHz | -10 dBm | <200Hz | 3% AT 1KHz | -50 dB | +/-5 Khz |

| CHANNEL TYPE | | FREQUENCY | 12dB SINAD SENSITIVITY (135 ohms) | 3dB BANDWIDTH | DISTORTION | 20dB QUIETING SENSE | ADJACENT CHANNEL |
|---|---|---|---|---|---|---|---|
| AUDIO (PAGE) | RECEIVE | 390 KHz | -65 dBm | 15 KHz +/-2KHz | 3% AT 1KHz | -65 dBM | -50dB |
| AUDIO (INTERCOM) | ANSWER | 420 KHz | -65 dBm | 15 KHz +/-2KHz | 3% AT 1KHz | -65 dBM | -50dB |
| AUDIO (INTERCOM) | ORIGINATE | 360 KHz | -65 dBm | 15 KHz +/-2KHz | 3% AT 1KHz | -65 dBM | -50dB |

FIG. 3A

| CHANNEL TYPE | | FREQUENCY | MAX. POWER (135 ohms) | RESIDUAL FM | DISTORTION | SPURIOUS | MAX. DEVIATION |
|---|---|---|---|---|---|---|---|
| DATA | TRANSMIT | 319/331 KHz | -10 dBm | N/A | N/A | -50 dB | +/-5 KHz |

| CHANNEL TYPE | | FREQUENCY | -12dB SINAD SENSITIVITY (135 ohms) | 3dB BANDWIDTH | DISTORTION | 20dB QUIETING SENSE | ADJACENT CHANNEL |
|---|---|---|---|---|---|---|---|
| DATA | RECEIVE | 319/331 KHz | N/A | 15 KHz +/-2KHz | N/A | N/A | -50dB |

FIG. 3B

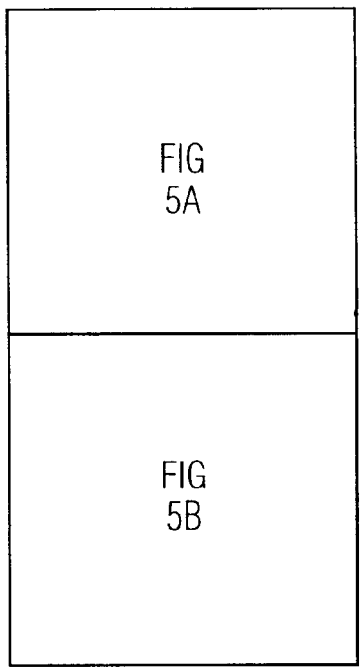

WHERE
0 OR 1 --- DON'T CARE IN RECEIVING SIDE
n --- FROM 0 TO 31, I.E. 32 USERS MAXIMUM
    31 - 33 ARE DEDICATED FOR NEW USER TO JOIN IN, SAY JOIN-IN SLOTS

L6, L5, L4, L3, L2, L1 --- = 1, LINE ACTIVE; = 0, LINE INACTIVE
EXT # --- 4 DECIMAL DIGITS (CONFIGURATION 4TH, 3RD, 2ND, 1ST DIGITS TO FORM AN EXT #)
    IF EXT# IS INAPPLICABLE, SET C, C, C, C FOR AN EMPTY EXTENSION
            L5 & L6 RESERVED

JOIN IN SLOT - 31 TO 33
JOIN IN ID - 0 TO 30

MESSAGE WAITING ON/OFF (EXTENSION), TRANSFER ON
    SUPPORT ONE LINE AT ONE COMMAND.

FIG. 5

|  | ORIG. ADDR 6 BITS | COMMAND 6 BITS | OPERAND1 6 BITS | OPERAND2 64 BITS | CHECK SUM 8 BITS |
|---|---|---|---|---|---|
| BROADCAST |  |  |  |  |  |
| LINE ON HOLD | n | LINE ON HOLD. | L6, L5, L4, L3, L2, L1 | 4 EXT # - L6, L5, L4, L3 (4 DIGITS EACH) |  |
| LINE IN USE | n | LINE IN USE | L6, L5, L4, L3, L2, L1 | 4 EXT # - L6, L5, L4, L3 (4 DIGITS EACH) |  |
| LINE SECURE | n | LINE SEC | L6, L5, L4, L3, L2, L1 | 4 EXT # - L6, L5, L4, L3 (4 DIGITS EACH) |  |
| LINE SECURE RELEASE | n | LINE SEC REL | L6, L5, L4, L3, L2, L1 | 4 EXT # - L6, L5, L4, L3 (4 DIGITS EACH) |  |
| MESSAGE WAITING ON (EXTENSION) | n | M WAIT ON (EXTENSION) | 0 | EXT # (4 DIGITS), 000000L2, L1, 0 |  |
| MESSAGE WAITING OFF (EXTENSION) | n | M WAIT OFF (EXTENSION) | 0 | EXT # (4 DIGITS), 000000L2, L1, 0 |  |
| JOIN | JOIN IN SLOT | JOIN | JOIN IN ID | 0,0,0,0 |  |
| CALLER ID | n | CALLER ID | CALLER ID PACKET # | INFORMATION |  |
| PASS THROUGH | n | PASS THRU | PASS THRU' OPERAND 1 | PASS THRU' OPERAND 2 |  |
| PARTNERSHIP |  |  |  |  |  |
| TRANSFER ON | n | TFR ON | DEST. ADR | EXT # (4 DIGITS), 000000L2, L1, MAIL ID, 0 |  |
| TRANSFER OFF | n | TFR OFF | L6, L5, L4, L3, L2, L1 | 4 EXT # - L6, L5, L4, L3 (4 DIGITS EACH) |  |
| INTERCOM ON | n | ICM ON | DEST. ADR. | ICM PICK UP INDICATION, 0,0,0 |  |
| INTERCOM OFF | n | ICM OFF | DEST. ADR. | 0,0,0,0 |  |
| ACKNOWLEDGE | n | ACK | DEST. ADR. | 0,0,0,0 |  |
| ACCESS DENY | n | DENY | DEST. ADR. | 000000 NO EXT # BUSY,0,0,0 |  |

FIG. 5A

| | | | | |
|---|---|---|---|---|
| DND (DESTINATION) | n | DND (DESTINATION) | DEST. ADR. | 000000 OVERRIDE |
| MESSAGE WAITING OFF (DESTINATION) | n | M WAIT OFF (DESTINATION) | DEST. ADR | 0,0,0,0 |
| RAM ACCESS REQUEST | n | RAM ACCESS REQUEST | DEST. ADR | RAM REQUEST, ADDR., DATA |
| RAM ACCESS RESPONSE | n | RAM ACCESS RESPONSE | DEST. ADR | RAM RESPONSE, ADDR., DATA |
| EXTENDED COMMAND | | | | |
| REJECT | n | EXT. COM | REJECT | 0,0,0,0 |
| NO ACTION CHANGE | n | EXT. COM | NO CHANGE | 0,0,0,0 |
| PAGE ON | n | EXT. COM | PAGE ON | GROUP, 0 |
| PAGE OFF | n | EXT. COM | PAGE OFF | 0,0,0,0 |
| INTERCOM IN USE | n | EXT. COM | ICM IN USE | ICM CALLED ID, ICM IN TALKING INDICATION, 0,0,0 |
| MUSIC AVAILABLE | n | EXT. COM | MUSIC AVAILABLE | 0,0,0,0 |
| MUSIC UNAVAILABLE | n | EXT. COM | MUSIC UNAVAILABLE | 0,0,0,0 |
| SUPERVISORY CALL | n | EXT. COM | SUPERVISORY CALL | 0,0,0,0 |
| SUPERVISORY CALL CONFIRMATION | n | EXT. COM | SUPERVISORY CALL CONFIRMATION | 0,0,0,0 |
| SUPERVISORY CALL END | n | EXT. COM | SUPERVISORY CALL END | 0,0,0,0 |

FIG. 5B

TELEPHONE PORT WITH AUTOMATIC DETECTION AND SECURE

This application is related to the following co-pending, commonly assigned, U.S. patent applications, both filed on May 6, 1999, in the names of the present inventors: application Ser. No. 09/306,038, titled "Page in a Selected Phone Group"; and application Ser. No. 09/306,040, titled "Flexible Time Slot for Communication."

FIELD OF THE INVENTION

The present invention generally relates to a communication system and method, and in particular, to a method and system of automatically detecting that a telephone port is being used and securing the telephone line of the telephone port. The present invention generally relates to a communication system and method, and in particular, to a method and system of adjusting a time period of a time slot in a communication channel, depending on the information present in the time slot.

BACKGROUND OF THE INVENTION

There are several types of multiline telephone systems on the market today. One type of multiline system is referred to as a "key telephone system." This type of system has multiple telephones known as "key telephones", each connected by a communication medium to a central control box referred to as a "key service unit" (KSU).

There are some potential problems with a key telephone system. One problem is the wiring required for each telephone in the system to be connected to the central control box. Another problem is that since most of the intelligence is built into the central control box, there is a single point of failure in the system.

In view of these and other objectives, the present invention relates to a method and system of automatically detecting that a telephone port is being used and securing the telephone line associating with the telephone port. In one embodiment, a method and system for automatically securing a telephone line in a telephone system having more than one telephone line, comprising the steps of:

Detecting usage of a device connected to said telephone line;

Notifying telephones in said system via a data packet to secure said telephone line; and In response to said data packet, said telephones prevent a user from accessing said telephone line.

BRIEF DESCRIPTION OF THE DRAWINGS

FIGS. 3A and 3B show characteristics of system voice and data communication channels respectively.

FIG. 5 shows a table of commands according to a protocol associated with an embodiment of the present invention.

DETAILED DESCRIPTION OF THE DRAWINGS

Figure 1:
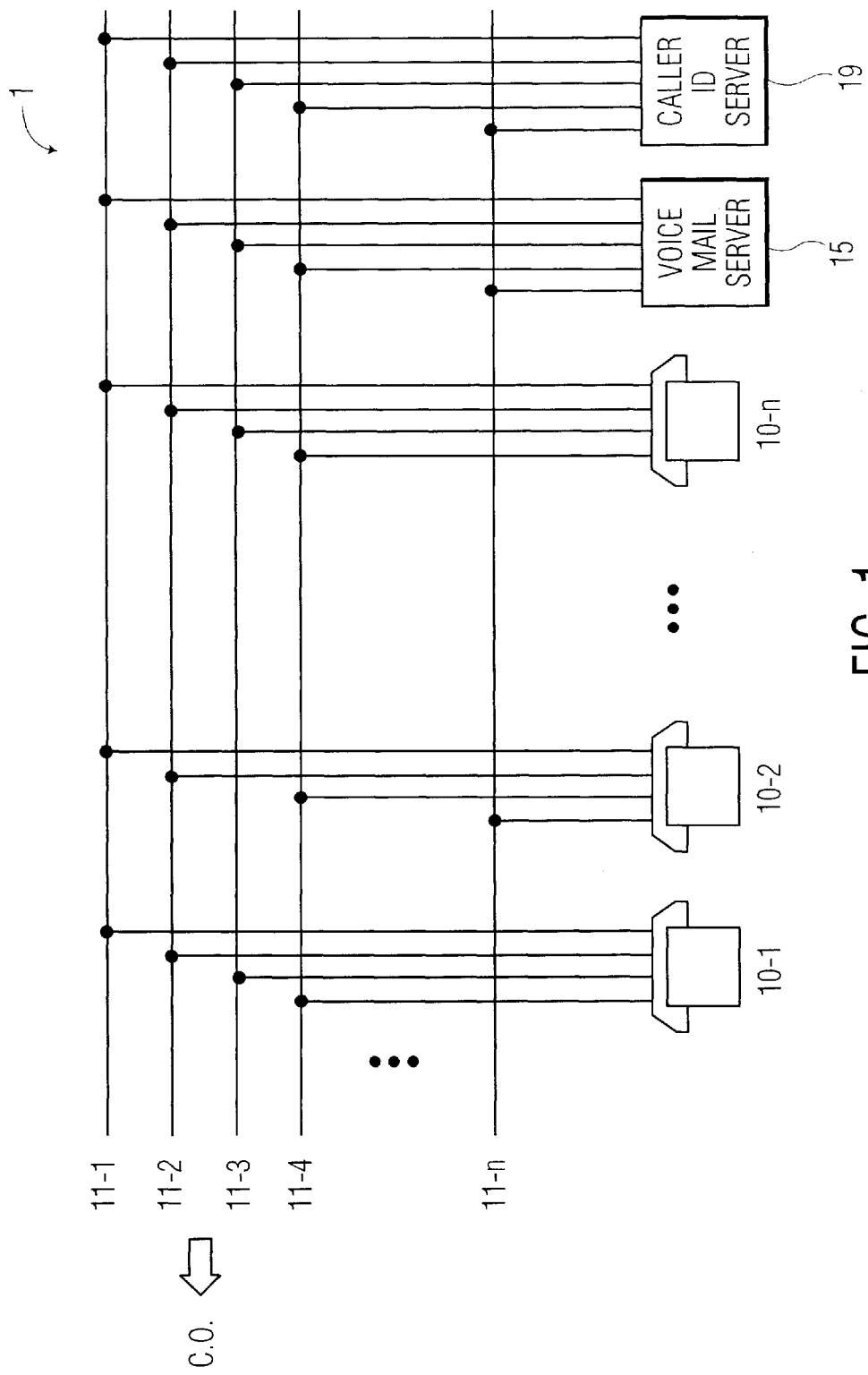
FIG. 1 shows a system architecture of an embodiment of the present invention.

FIG. 1 shows an exemplary KSU-less telephone system capable of implementing the present invention. The system comprises a plurality of telephones 10-1 to 10-n interconnected to each other and to telephone lines 11-1 to 11-n, which are to/from a central office. System 1 also includes a voice mail server 15 and a Caller ID server 19. Caller ID server 19 is capable of processing caller ID information received. Voice mail server 15 is capable of processing voice mail for system 1.

Figure 2:
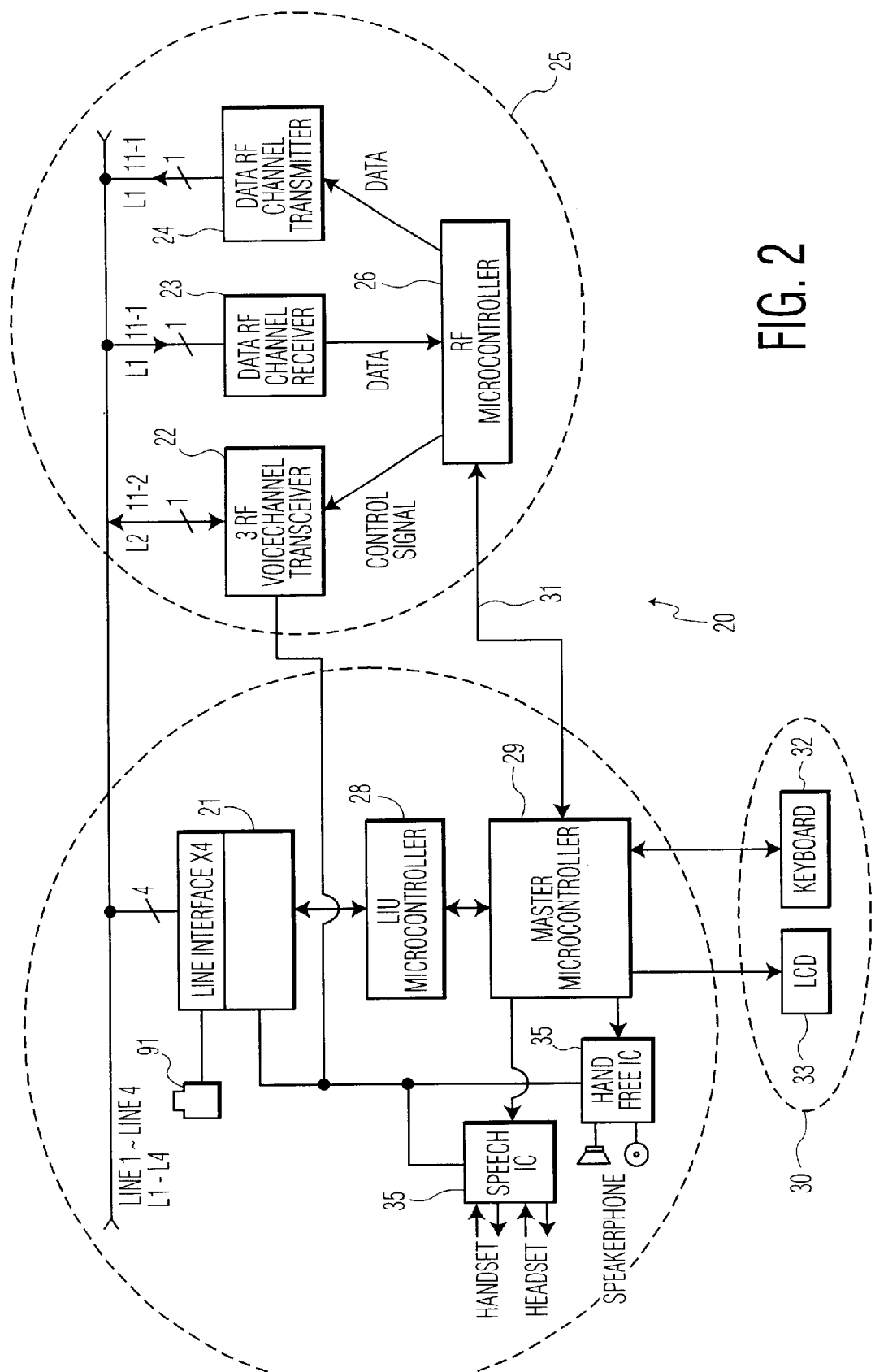
FIG. 2 shows, in block diagram form, a telephone constructed in accordance with aspects of an embodiment of the present invention.

In the present exemplary embodiment, every telephone 10-1 to 10-n in system 1 needs to be connected to lines 11-1 and 11-2. This is because line 11-1 is used for control data communications and line 11-2 is for audio communication among the telephones, as will be explained in more detail below. FIG. 2 shows a hardware block diagram representing one of the telephones 10-1 to 10-n shown in FIG. 1. Each telephone 20 comprises a line interface circuit 21 which is capable of being connected to 4 pairs of telephone lines selected from lines 11-1 to 11-n shown in FIG. 1. Each pair of telephone lines 1-4 represents a pair of Tip and Ring wires. The function of the line interface circuit 21 is to provide line conditioning and line status sensing. It also provides line switching and bridging among the 4 telephone lines to implement, for example, conferencing capabilities.

In addition, telephone 20 also includes a RF portion 25. The RF portion 25 comprises a transceiver circuit 22 for connecting to line 11-2 of the multiline system 1. As mentioned above, line 11-2 of the system is designated as the communication medium for intra-system audio communication, such as for intercom or paging among telephones 10-1 to 10-n in the system. Transceiver 22 is capable of transmitting and receiving three RF modulated and frequency multiplexed audio channels carried on line 11-2. One of the audio channels is used for paging in a half duplex mode, and the other two channels are used for full duplex intercom. Exemplary characteristics of the audio channels are listed in FIG. 3A. An example of a suitable IC capable of implementing the functions of transceiver 22 is MC13109, available from Motorola.

There is also a transmitter 23 and receiver 24 pair for implementing a data channel. As described before, the data channel is used to transfer system control and signaling data among telephones 10-1 to 10-n and any other adjunct servers such as voice mail server 15 and caller ID server 19. A summary of the characteristics of an exemplary data channel is shown in FIG. 3B. The data channel's maximum bit rate is in the range of 2 Kbps, using Manchester coding. An exemplary modulation and demodulation method is narrow band FSK. An example of a suitable IC capable of implementing the functions of receiver 23 is MC3361, available from Motorola. The transmitter 24 may be implemented as a VCO based discrete circuit, as is well know in the art.

Audio transceiver 22, and data transceiver pair 23 and 24 are monitored and controlled by a RF microcontroller 26. Microcontroller 26 monitors the status of the transceivers and also communicates with a master microcontroller 29 for telephone 20. RF microcontroller 26 is also responsible for generating the timing signals for the various transceivers in the RF portion of telephone 20. RF microcontroller is also responsible for physical and link level control of the data channel carried on line 11-1. An example of a suitable IC capable of implementing the functions of RF microcontroller 26 is TMP 87C808, available from Toshiba.

A master microcontroller 29 monitors and controls the various functions of telephone 20. It monitors and controls the line interface circuit 21 through a line interface unit (LIU) microcontroller 28. An example of a suitable IC capable of implementing the functions of the LIU microcontroller 28 is TMP87C446N, available from Toshiba.

The master controller 29 also interfaces with the RF portion 25 through a serial bus 31 connected to the RF microcontroller 26. The master controller 29 also communicates with user interface portion 30 of the telephone 20, such as a keyboard 32 and a display 33 of telephone 20. It also controls a speech IC 35 which is connected to handset and/or headset of the telephone. In addition, a handfree circuit 35 is also being monitored by the master microcontroller 29 to implement speaker phone functions for telephone 20. An example of a suitable IC capable of implementing the functions of master microcontroller 29 is TMP 87CM53F, available from Toshiba.

Figure 4:
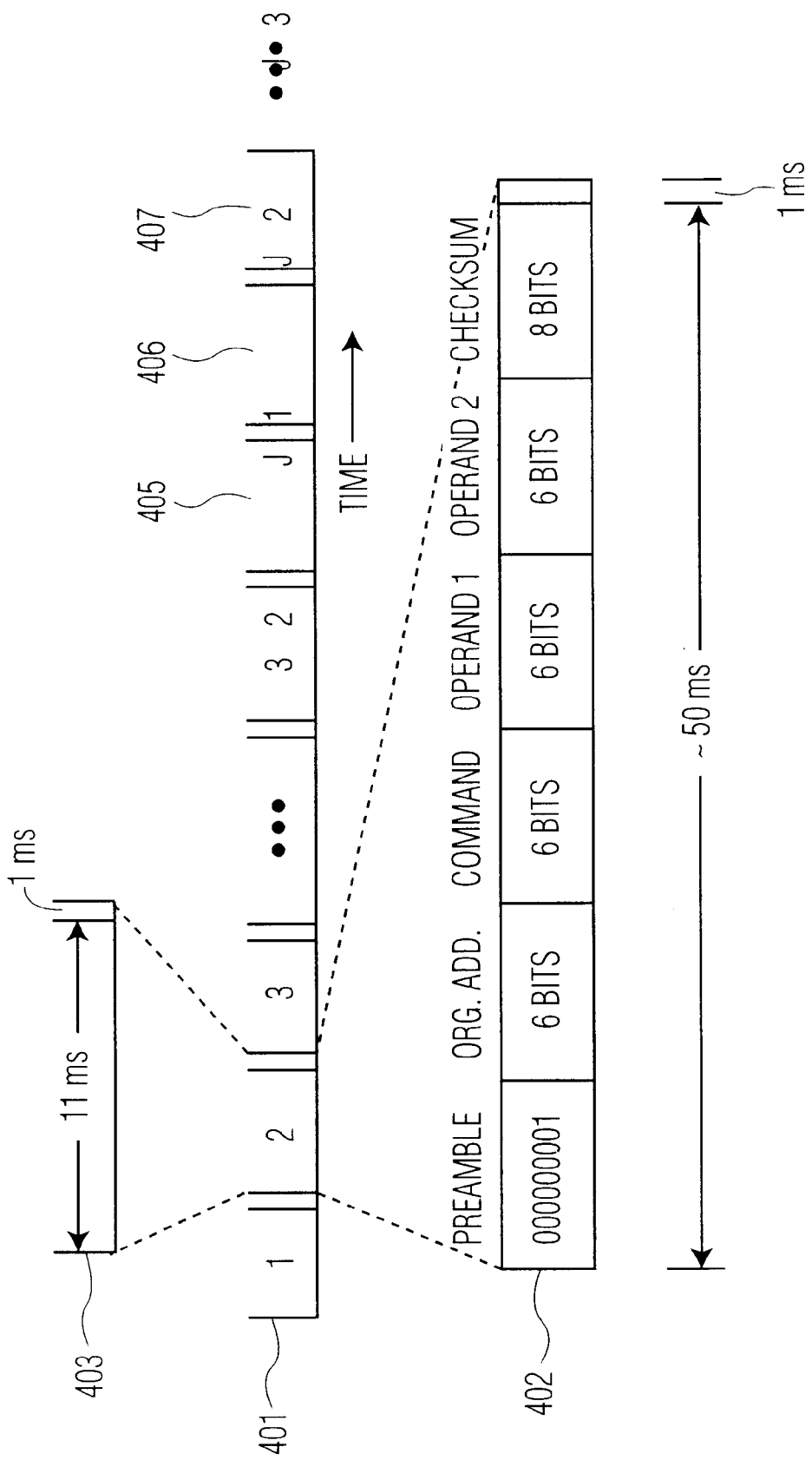
FIG. 4 shows various structure and time duration of a protocol associated with an embodiment of the present invention.

As discussed above, telephones 10-1 to 10-n in the KSU-less system 1 communicate among each other to implement the features of the system using a data communication channel carried on line 11-1 of the system. The data channel is further divided by a time slot allocation scheme shown as element 401 of FIG. 4. As shown in FIG. 4, the data channel is divided into 32 data packet time slots and 3 "join-in" (e.g., J) time slots. The function and utilization of these time slots will be discussed in more detail below.

When telephones 10-1 to 10-n in system 1 are first interconnected and powered up, each telephone is first assigned a respective station ID by a system administrator. The telephones will then only transmit data information at the time slot corresponding to its own station ID. For example, a telephone may be assigned a station ID 5. The telephone will then only broadcast data on time slot 5. Every telephone in system 1, however, will monitor the data channel at all times to see if it needs to respond to any data on the data channel.

Element 402 of FIG. 4 shows a generic data packet structure of an exemplary protocol to implement the principles of the present invention. As shown in FIG. 4, a typical data packet comprises of a 9-bit preamble, a 6-bit command, a 6-bit operand 1, a 6 bit operand 2, an 8 bit checksum, a 1 bit stop bit and a 1 bit guard bit. Each bit is RZ Manchester coded and lasts 500 μs. FIG. 5 shows the syntax of various commands that may be used by the present system to implement the principles of the present invention.

When a telephone is initially powered up in the present system, it is in a free running mode based on its own internal timing. Each of the telephones 10-1 to 10-n will then attempt to synchronize itself with all other telephones in system 1 according to a synchronizing and identification algorithm such as that shown in FIG. 6.

Figure 6:
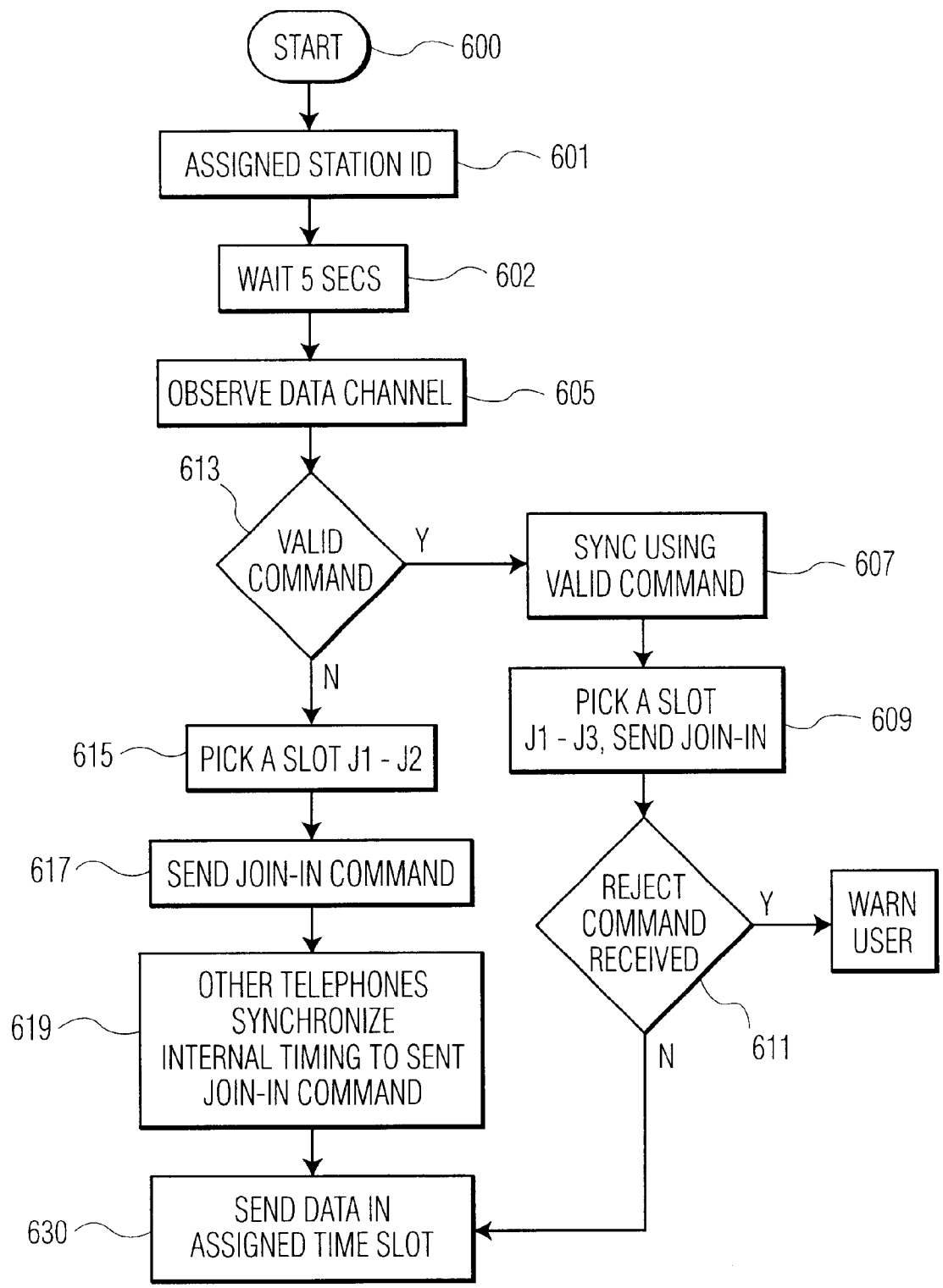
FIG. 6 is a flow diagram of an initialization and synchronization process.
Figure 7:
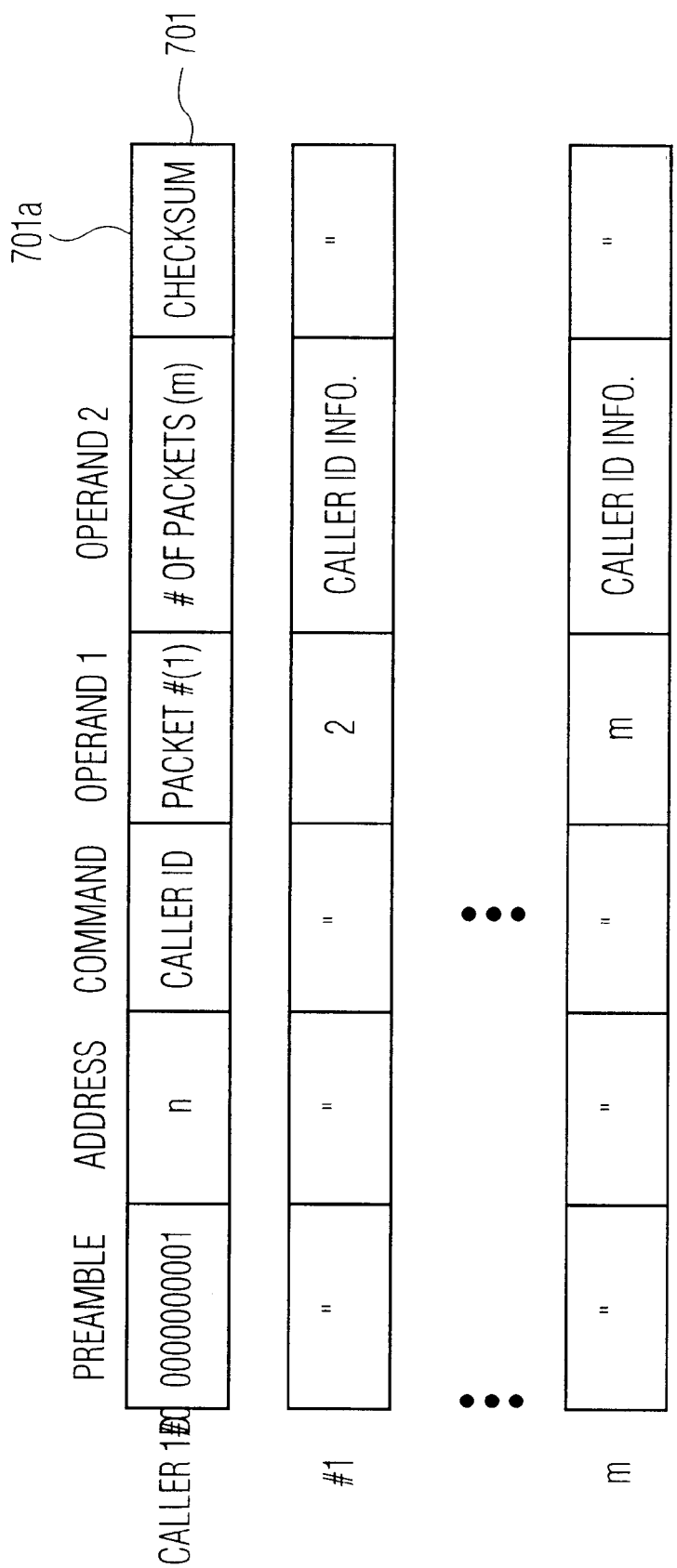
FIG. 7 is an illustration of a caller id information data packet.

As shown in step 601 of FIG. 6, after a telephone in system 1 is initially powered up and a station ID has been assigned, the telephone will wait a period of time, for example, 5 seconds as shown in step 602. This waiting period provides time to let another telephone, which may have already started the initialization process for system 1, to complete the initialization process.

In step 605, after the waiting period, the telephone will monitor the data channel to see if there is any valid command present in the data channel. The valid command may be observed from a valid preamble shown for example, in element 402 of FIG. 4. This indicates that other telephones in system 1 are already operational and have been synchronized in system 1.

Once a valid command is observed, the telephone will then adjust its free-running timer, e.g., implemented in software of RF microcontroller 26, to synchronize with the already functioning system 1 as shown in step 607. The telephone will determine which time slot the system is currently at by observing the originating address of the data packet, because this address corresponds to the time slot number. In step 609, the initializing telephone will also broadcast a join-in message in one of the J time slots 405–407 as shown in FIG. 4. An example of a join-in command is shown in element 502 of FIG. 5. The purpose of the join-in message is to broadcast to the other phones that it is now present in the system. If this join in message is not rejected by a Reject message for a period of time as shown in step 611 then the initializing telephone has successfully become part of functioning system 1. The telephone may then transmit any data packet at the next occurrence of its assigned time slot as shown in step 630.

In step 613, if no valid command is observed for a certain period of time, the initializing telephone will then assume that it is the first telephone on the system trying to initialize. The telephone will then randomly pick one of J1 to J3 time slots to broadcast a join in command as discussed above in connection with step 609. Once this join in message is broadcast, other potentially existing telephone systems will then use this command to synchronize themselves to this first initializing telephone as shown in step 619. This first initializing telephone may then start transmitting in the time slot corresponding to its station ID, as shown in step 630.

In another aspect of the present invention, a data packet time slot of the data channel shown in FIG. 4, may be expanded or contracted dynamically to speed up transmission of the control and command data for system 1. The expansion and/or contraction of a time slot in system 1 is based on whether any data, as well as what type of data are being sent in the time slot.

Figure 8:
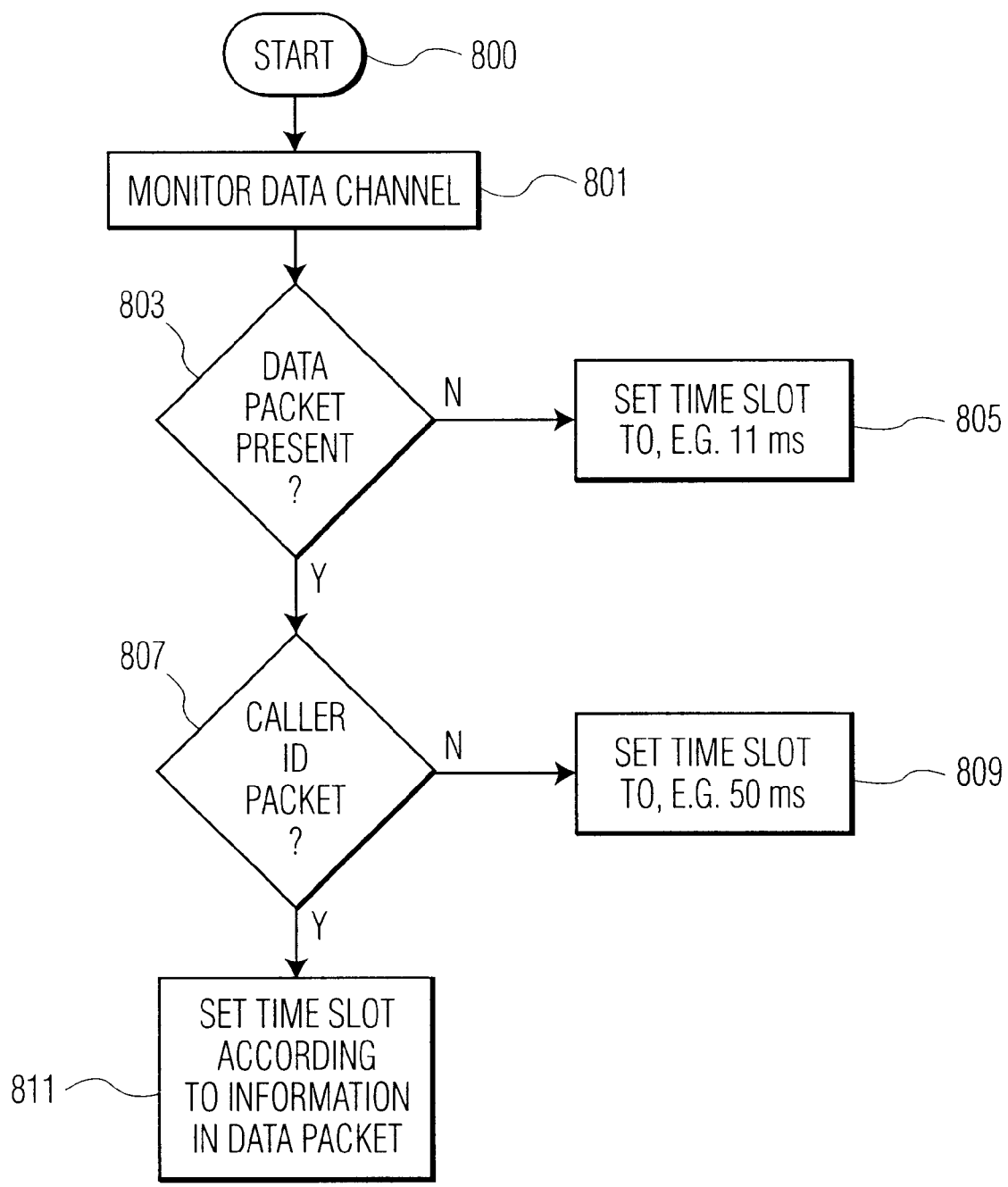
FIG. 8 shows, in flow diagram form, an exemplary embodiment of time slot adjustment in accordance with aspects of the present invention.

In accordance with principles the present invention, a flow diagram shown in FIG. 8 depicts an embodiment which allows every telephone in the present system to dynamically adjust the period of a time slot. As shown in step 801 of FIG. 8, and as discussed previously, every functioning telephone in the system is constantly monitoring the data channel for any relevant data message. Any telephone in system 1 can therefore decide whether there is any data packet present in a time slot, by looking at whether there is, for example, a valid preamble present. As discussed above, a valid preamble may comprise eight zeros followed by a one, as shown in FIG. 4.

Therefore, if a telephone in the present system observes that there is no data packet present in a particular time slot, the telephone will decrease the duration of particular time slot time to a first time period, e.g., 11 ms, as shown in step 805 of FIG. 8. On the other hand, when there is a data packet occupying a time slot, the telephone will need to make a further determination as to what type of data packet this is as shown in steps 803 and 807. In particular, as shown in step 807, the telephone needs to determine whether the data packet is a caller ID packet.

As shown in step 805, if the telephone determines that the data packets is not a caller ID packet, then the duration of the time slot will remain at a second time period, e.g., 50 ms, as shown in element 401 of FIG. 4. On the other hand, if the data packet is a caller ID packet then the time slot duration will be expanded to a third time period as described below.

A caller ID packet is used to transport incoming Caller ID information that has been processed by a Caller ID server 19 for display on a telephone in system 1. An example of a caller ID packet is shown as element 505 of FIG. 5 and in FIG. 9. In the present embodiment, received Caller ID information is broken down into more than one data packet so that more than 64 bits of Caller ID information may be sent in the operand 2 field of a data packet.

Figure 9:
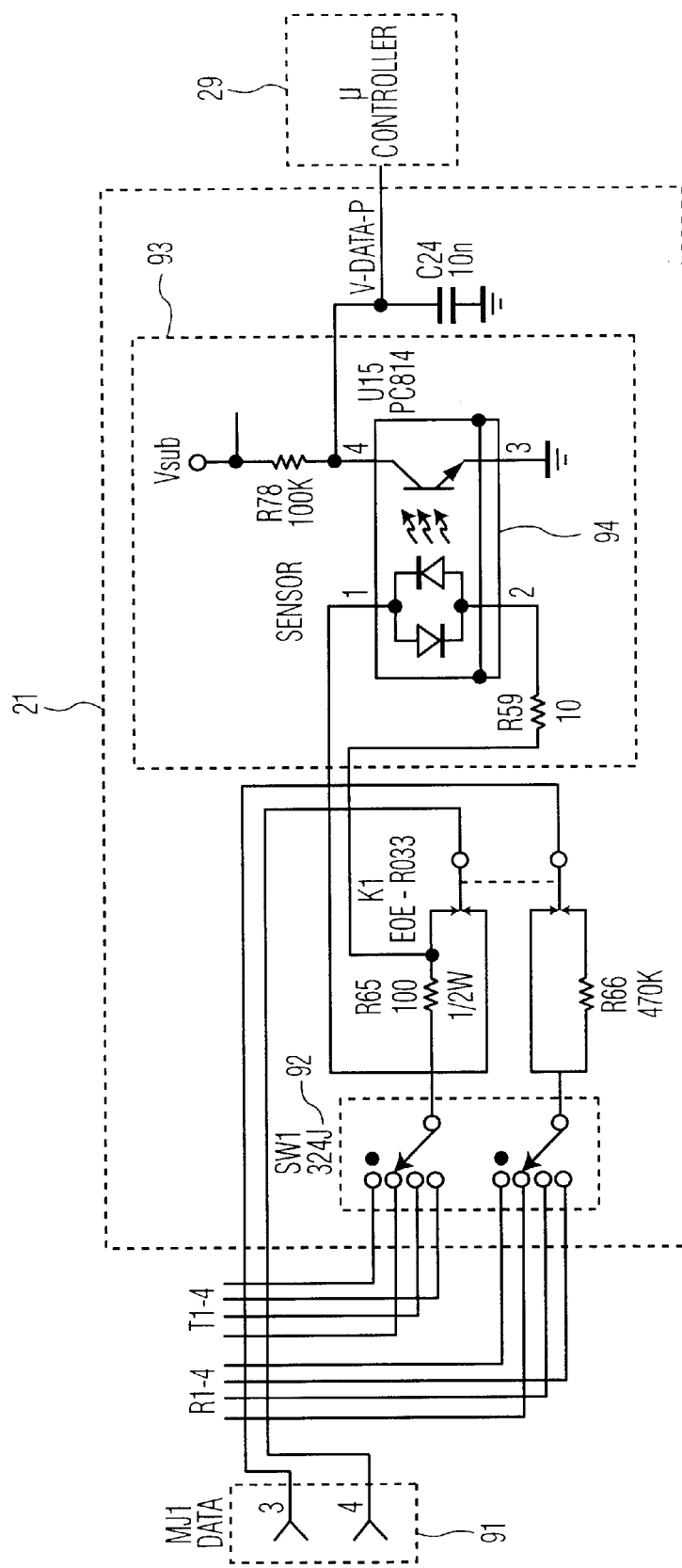
FIG. 9 shows, in schematic diagram form, an embodiment of a line secure feature.

In particular, as shown in FIG. 9, the operand 2 of the first Caller ID packet 701 contains a number indicating how many packets will be transmitted for this particular Caller ID information. In order to transmit these multiple Caller ID packets as shown in FIG. 9, each telephone in the system, once it determines that a Caller ID packet is being sent in a time slot, will increase the length of the time slot to allow the transmission for all the caller ID packets consecutively, as shown in FIG. 9. In particular, each telephone in the system will expand the length of a regular packet time slot (e.g., 50+1 ms shown as element 402 of FIG. 2) by a factor equal to the number of packets for the Caller ID information as determined from Operand 2 (i.e., 701*a*) of the first Caller ID packet 701. This way, the whole Caller ID information is transmitted contiguously, without having to wait for the time slot in the next cycle. The protocol according to FIG. 8 therefore allow a time slot to be dynamically expanded or contracted based on the content of the time slot.

The flow chart of FIG. 8 is preferably implemented as software to be executed by RF microcontroller 26 shown in FIG. 2. As implemented, microcontroller 26 is responsible for physical and link layer of the data channel and also controls and monitors the timing of the data transmitter 24 and data receiver 23 of the data channel.

In another aspect according to the principles of the present invention, a user is able to secure a telephone line in the system automatically, so that no other telephone is able to also pick up the secured line. This is particularly advantageous when the line is used for data services such as for modem or fax transmission.

Each telephone shown for example, in FIG. 2, of system 1 comprises a RJ-11 data jack 91. This data jack 91 may be used by, for example, a modem, a fax machine or just a Plain Old Telephone(POT). A user may configure this data port to be connected to any of the 4 telephone lines, L1–L4, a telephone 20 is connected to by a slide switch in Line Interface circuit 21 of FIG. 2.

FIG. 9 shows in more detail this configuration. A slide switch 92 is coupled between data jack 91 and telephone lines 1–4 (represented by R1-4 and T1-4) of a telephone in the system. A sensor 93 is coupled to one terminal of phone jack 91 through a sensing resistor R65. In this exemplary embodiment, sensor 93 comprises an optical coupler 94. Therefore, when there is a device such as a modem or a fax connected to data jack 91 and is active, current will be generated through resistor R65 and sensed by sensor 93. A signal v-data-p will then be generated and monitored by microcontroller 29.

Once microcontroller 29 senses that v-data-p is active (low), indicating there is a device active on the data port, the controller will broadcast a line secure command on the data channel at the time slot that is assigned to the present unit. The line secure command is shown, for example, as element 501 in FIG. 5.

Line secure command 501 has a first operand which indicates which line (e.g., L1–L4; L5–L6 are currently reserved) of the data device is active from the point of view of the telephone sending the line secure command. The second operand of the command indicates an extension number of the line the telephone is trying to secure. This second operand is needed since only Line 1 and Line 2 have to be connected to all the telephones in the system. Therefore, Line 3 and Line 4 for each telephone in the system may be different physical lines and have different extension numbers. Operand 2, by specifying an extension number, can resolve the ambiguity, as described in more detail below.

Figure 10A:
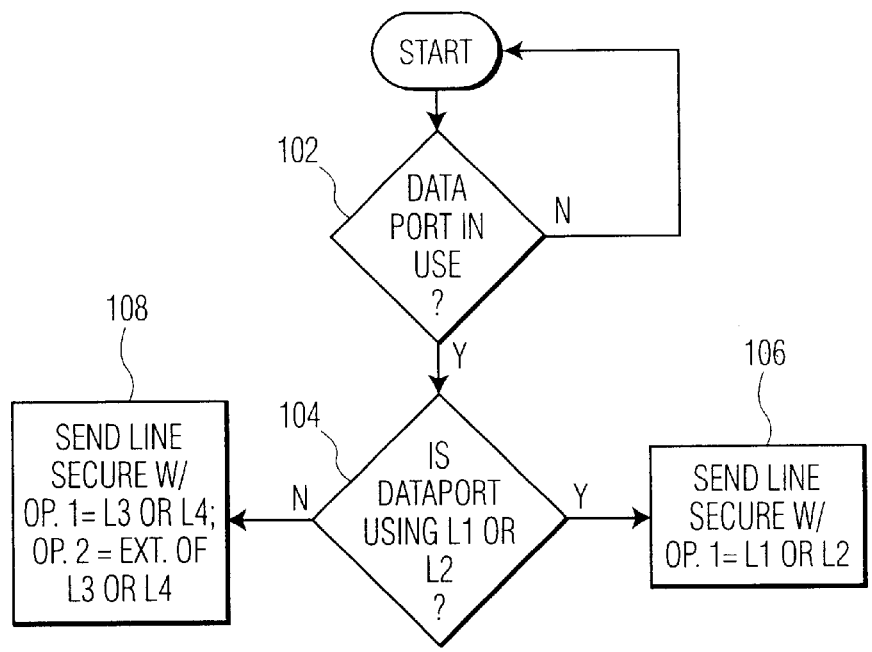
FIGS. 10A and 10B illustrate a line secure feature in accordance with. the principles of the present invention.
Figure 10B:
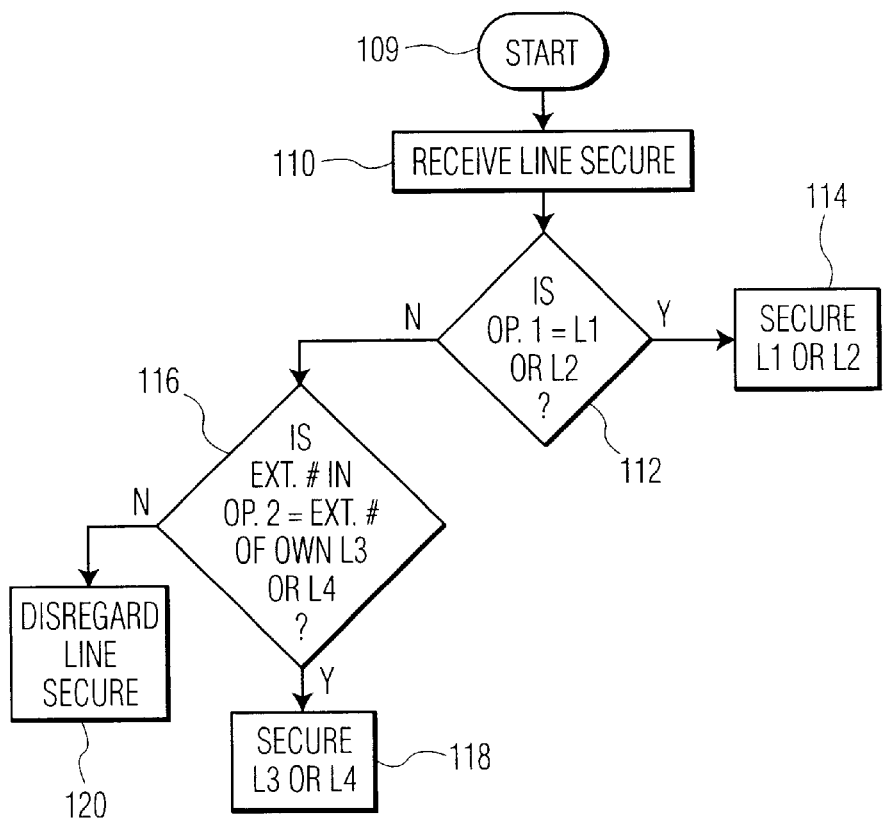

FIGS. 10A and 10B show a flow diagram in connection with the line secure command. FIG. 10A is a sending process and FIG. 10B is a receiving process. In step 102 of FIG. 10A, a telephone at which a data port is attached will monitor and determine if the data port is in use as described before. If this data port is in use, the telephone will then decide whether this port is connected to line 1 or line 2 of the telephone, as in step 104. If the line being secured is either line 1 or line 2 then the telephone will send the line secure command with Operand 1 set to either L1 or L2 as shown in step 106. If on the other hand, the line being secured is L3 or L4, the telephone will set Operand 1 of the command to either L3 or L4. The telephone will also put the corresponding extension number of the line in the second operand of the command.

On the receiving end, each telephone in the system will receive the line secure command that was broadcast as illustrated in FIG. 10A. In step 112, a receiving telephone will first determine whether Operand 1 of the received command contains either L1 or L2. In step 114, if the condition is true, microprocessor 29 in the telephone will then secure the line. Securing a line means that a user of the telephone will not be able to access the line. This is done, for example, by a control program of microprocessor 29. Also, a visual indication may be given to a user to notify the user that a particular line is secured by lighting up an LED associated with the line or an indication on LCD 33 as shown in FIG. 2. If the user still attempts to access the line, the telephone may give off an audio beep to notify the user that the line cannot be accessed.

On the other hand, if Operand 1 of the received command is L3 or L4, then the receiving telephone will also look at Operand 2 of the received command. It will compare the extension number in operand 2 with the extension numbers of its own L3 or L4, as shown in step 116. If there is match of the extension number, microprocessor 29 of the telephone will then 30 secure the corresponding L3 or L4. Otherwise, the line secure command is disregarded, as shown in step 120, since the particular line the sending telephone is trying to secure is not physically connected to the receiving telephone line.

Additionally, all the telephones in the system may display either the line number and/or the extension number of the line that has been secured. This information is included in the line secure data packet, as described before. For lines 1 and 2, the extension numbers associated with these lines were already preprogrammed in each telephones in the systems, therefore enabling them to display the extension associated with line 1 or 2, even though the extension number was not send in the data packet.

In another aspect of the present invention, system 1 also allows a group paging feature. A group paging feature allows any telephone in system 1 to send a one-way voice communication to a group of telephones that are in a community of interest. This feature according to the principles of the invention is illustrated in FIGS 11A and 11B and discussed below.

Figure 11A:
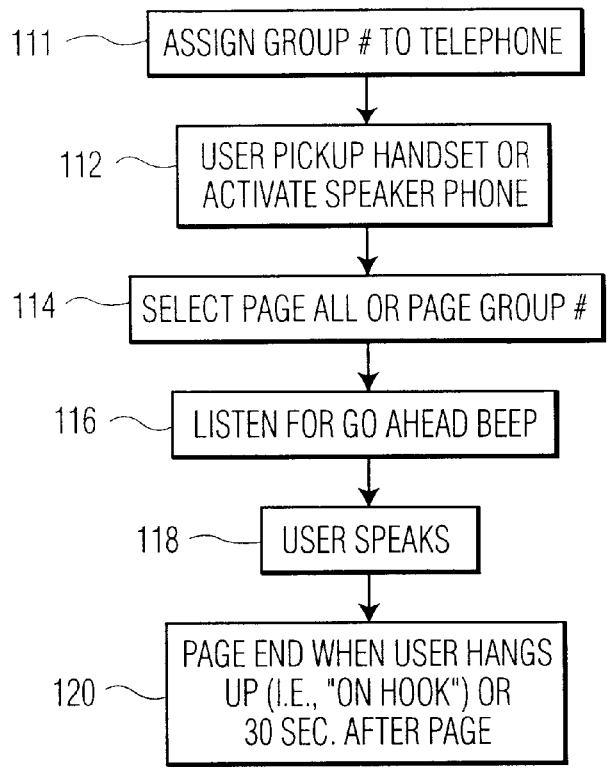
FIGS. 11A and 11B illustrate a group paging feature in accordance with the principles of the present invention.
Figure 11B:
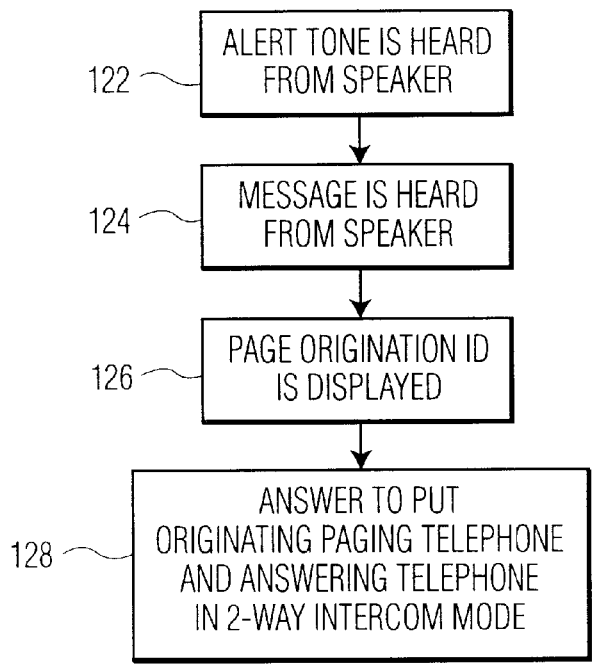

FIG. 11A illustrates the process flow of a paging telephone. At step 111, the telephone is assigned a group number in which it belongs in system 1 when the telephone is first powered up and being set up. At step 112, to initiate a group paging feature, a user of the telephone would either pick up a handset of the telephone or activate a speaker phone.

The user may then select to page all the telephones in system 1 or select a group number to page, as shown in step 114. This may be accomplished via keyboard 32 and LCD 33 of system 1 shown in FIG. 2.

Once a group is selected, microcontroller 29 of the paging telephone will then broadcast a "page on" command as shown in element 509 of FIG. 5. This command has an Operand 2, which contains the group number that this page is meant for. Once this command is sent, a go ahead beep will be sounded. After the user has heard this beep the user can then speak his or her paging message, as shown in steps 116 and 118. This paging message will be carried on the half-duplex audio voice channel carried on L2 of the system, as described in detail above. The page will end when the paging telephone is hung up by the user or will end automatically 30 seconds after the page, which ever is faster. The page is terminated when the paging unit sends a "page off" command as shown in 510 of FIG. 5.

FIG. 11B describes a receiving process of the group paging feature. At the receiving end, a telephone in the group being paged will realized that it is being paged by the page on command sent, as described above. Once this command is received at a telephone included in the group, an alert tone will be generated to alert a user, as shown in step 122. In one embodiment, the telephone will also automatically connect the half-duplex paging channel to the speakerphone of the paged telephone, so that the voice message is heard from the speaker, as in step 124. The paged telephone will also display the originating ID, which can be obtained from the page on command, on display 33 of the telephone. The user of the paged telephone after having heard the page message, may also initiate a 2-way conversation with the paging telephone by simply answering the telephone. A two way intercom is set up by the receiving telephone sending a "Intercom on command" shown in 511 of FIG. 5. Ad discussed above, intercom communications are carried on two full-duplex voice channels by transceiver 22 of FIG. 2.

It is to be understood that the embodiments and variations shown and described herein are for illustrations only and that various modification may be implemented by those skilled in the art without departing from the scope and spirit of the invention.

What is claimed is:

1. An apparatus for securing a telephone line in a multi-line telephone system have a plurality of telephones, comprising:

a sensor in one of said plurality of telephones for sensing changes on said telephone line and generating an indicative signal;

a controller coupled to said sensor for sending a data packet to other telephones in said system, indicating said telephone line is being secured, in response to said indicative signal; and said other telephones, in response to said data packet, preventing access to said telephone line.

2. The apparatus of claim 1 wherein said data packet comprising data representing a first number corresponding to the line number in said multi-line telephone system being secured.

3. The apparatus of claim 2 wherein said data packet further comprising data comprising a second number corresponding to an extension of the line number in said multi-line telephone system being secured.

4. The apparatus of claim 3 wherein if said extension number does not match any extension number of telephone lines connected to a receiving telephone, said data packet will be ignored.

5. The apparatus of claim 3 wherein said number corresponding to an extension only exists if said line number being secured is not a common line required by said telephone system.

6. A method of automatically securing a telephone line in a telephone system having more than one telephone line, comprising the steps of:

detecting usage of a device connected to said telephone line;

notifying telephones in said system via a data packet to secure said telephone line; and in response to said data packet, said telephones prevent a user from accessing said telephone line.

7. The method of claim 6 wherein said data packet comprising a number corresponding to the line number in said multi-line telephone system being secured.

8. The method of claim 7 wherein said data packet further comprising a number corresponding to an extension of the line number in said multi-line telephone system being secured.

9. The method of claim 8 wherein if said extension number does not match any extension number of the telephone lines connected to a receiving telephone, said data packet will be ignored.

10. The method of claim 7 wherein said number corresponding to an extension only exists if said line number being secured is not a common line required by said telephone system.

11. Apparatus for dedicating usage of a telephone line to a device coupled to the telephone line in a communication system having more than one communication units, comprising:

a first unit for detecting a change on the telephone line caused by the device, and for sending a signal in response to detecting the change;

a second unit responsive to said signal for preventing access to the telephone line by the second unit, wherein the signal comprising data representing a first number corresponding to a telephone line number in said communication system being secured.

12. The apparatus of claim 11 wherein said signal further comprising data comprising a second number corresponding to an extension of the telephone line number being secured.

* * * * *